Nov. 30, 1937.  F. L. O. WADSWORTH  2,100,760
METHOD AND APPARATUS FOR FEEDING THERMOPLASTIC MATERIAL
Filed April 9, 1935  5 Sheets-Sheet 2
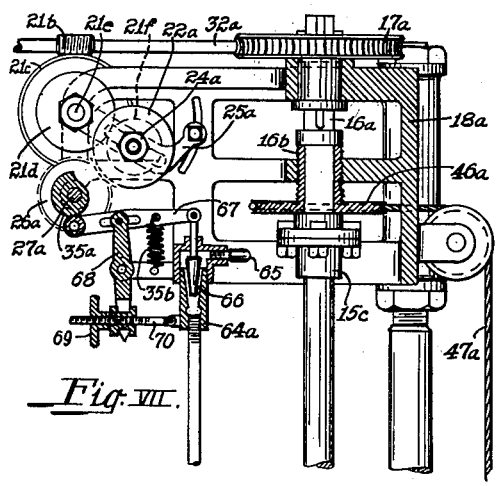
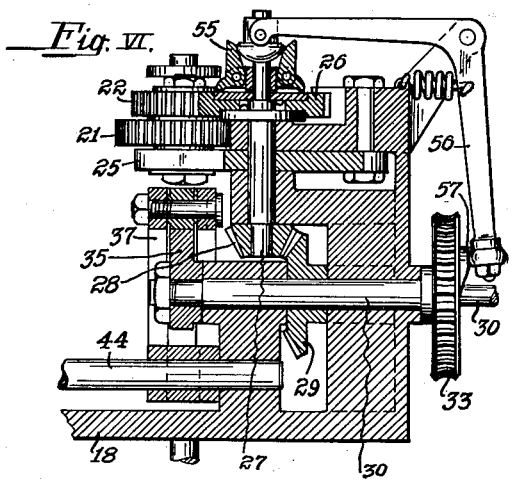
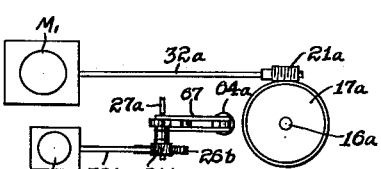
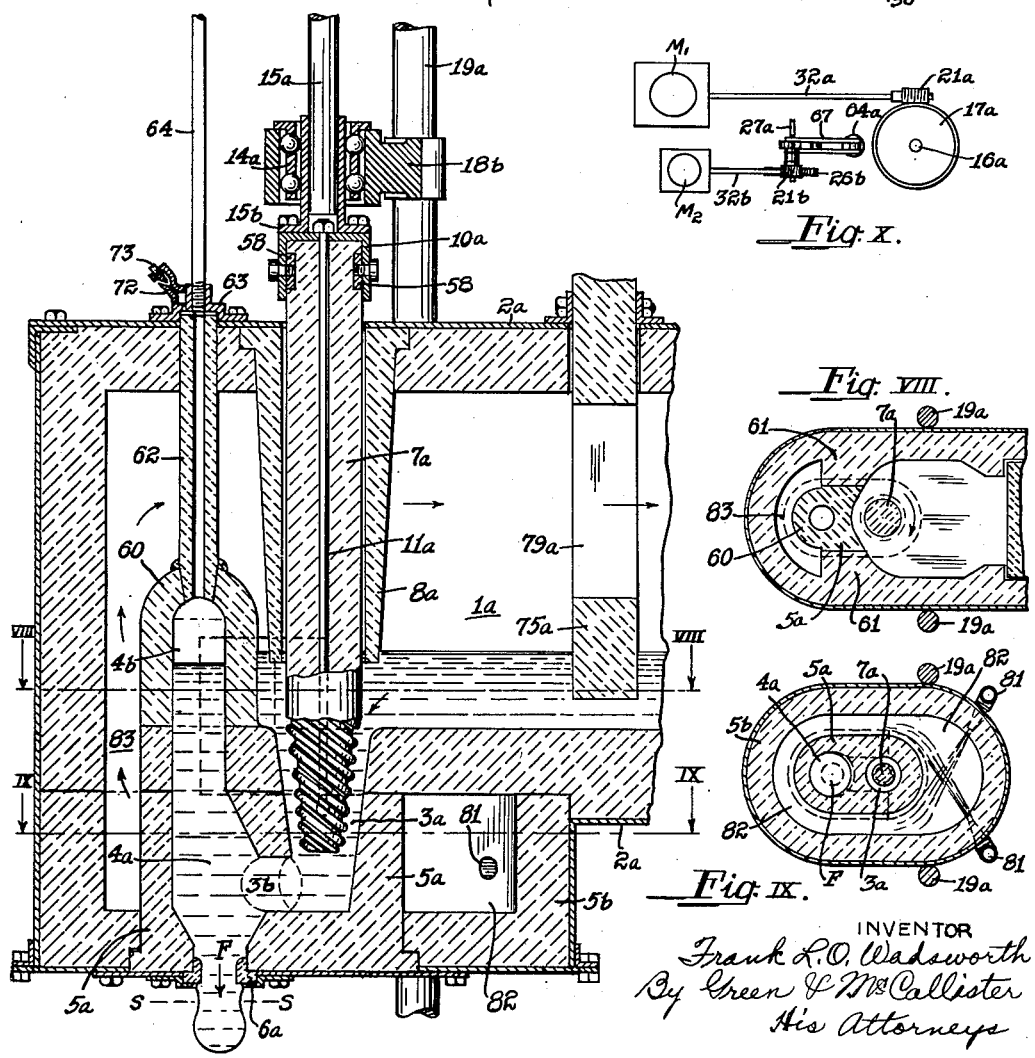
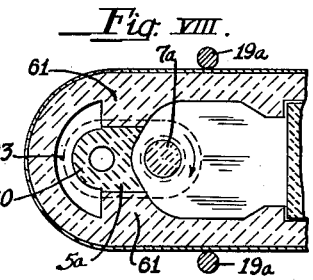
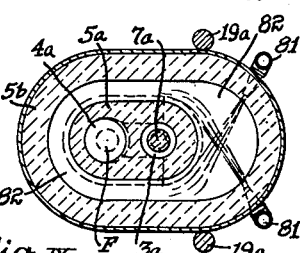
INVENTOR
Frank L. O. Wadsworth
By Green & McCallister
His Attorneys

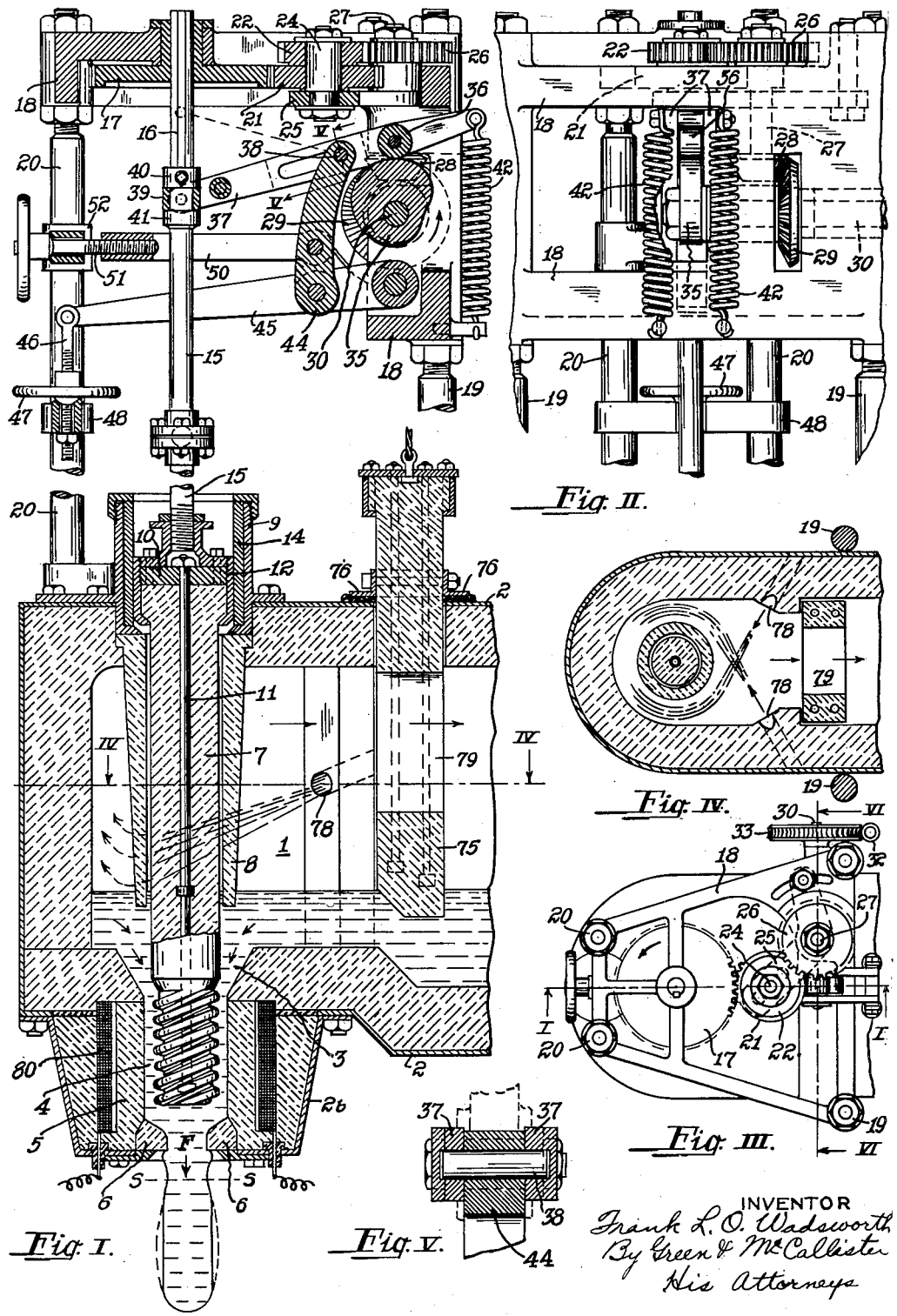

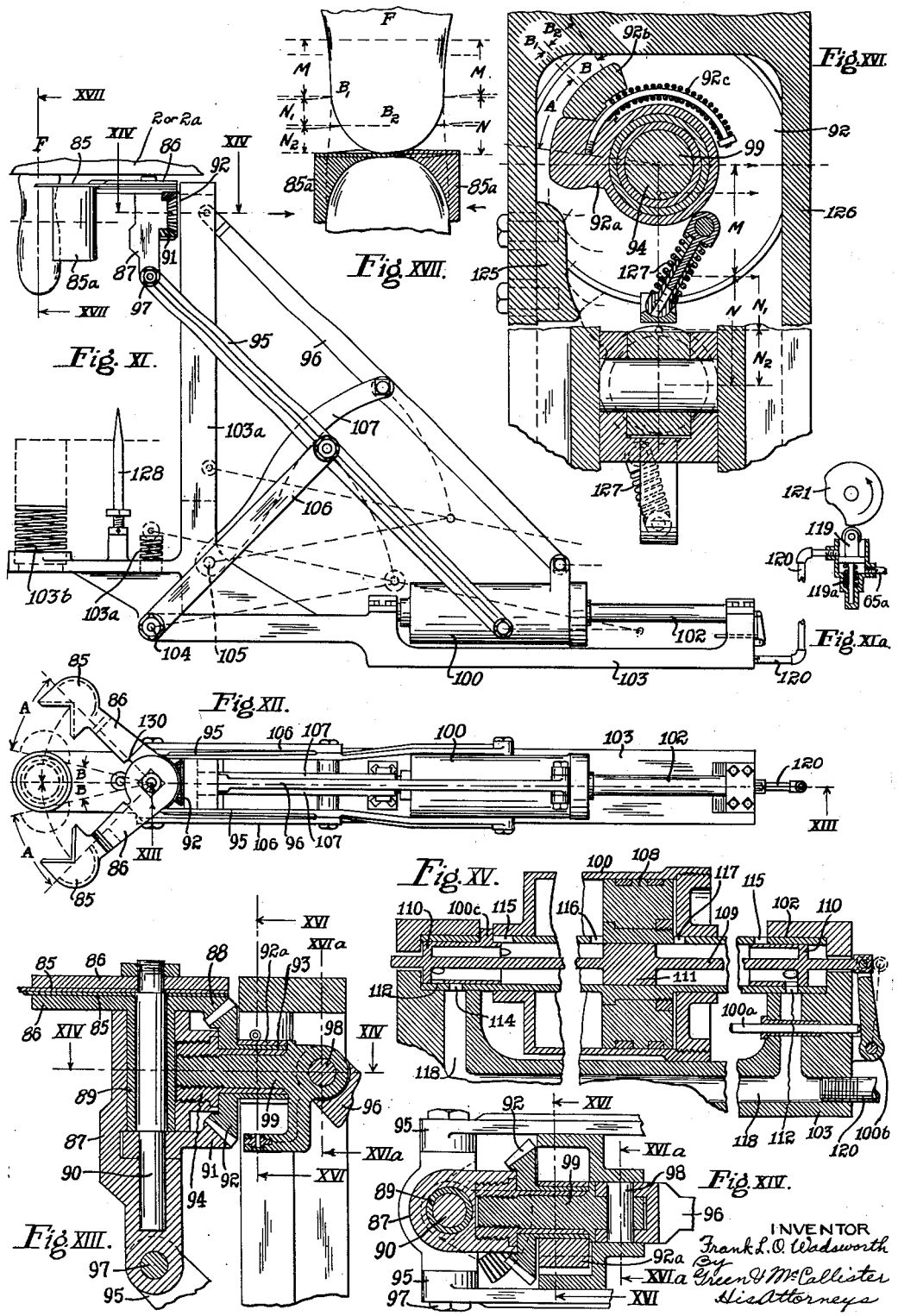

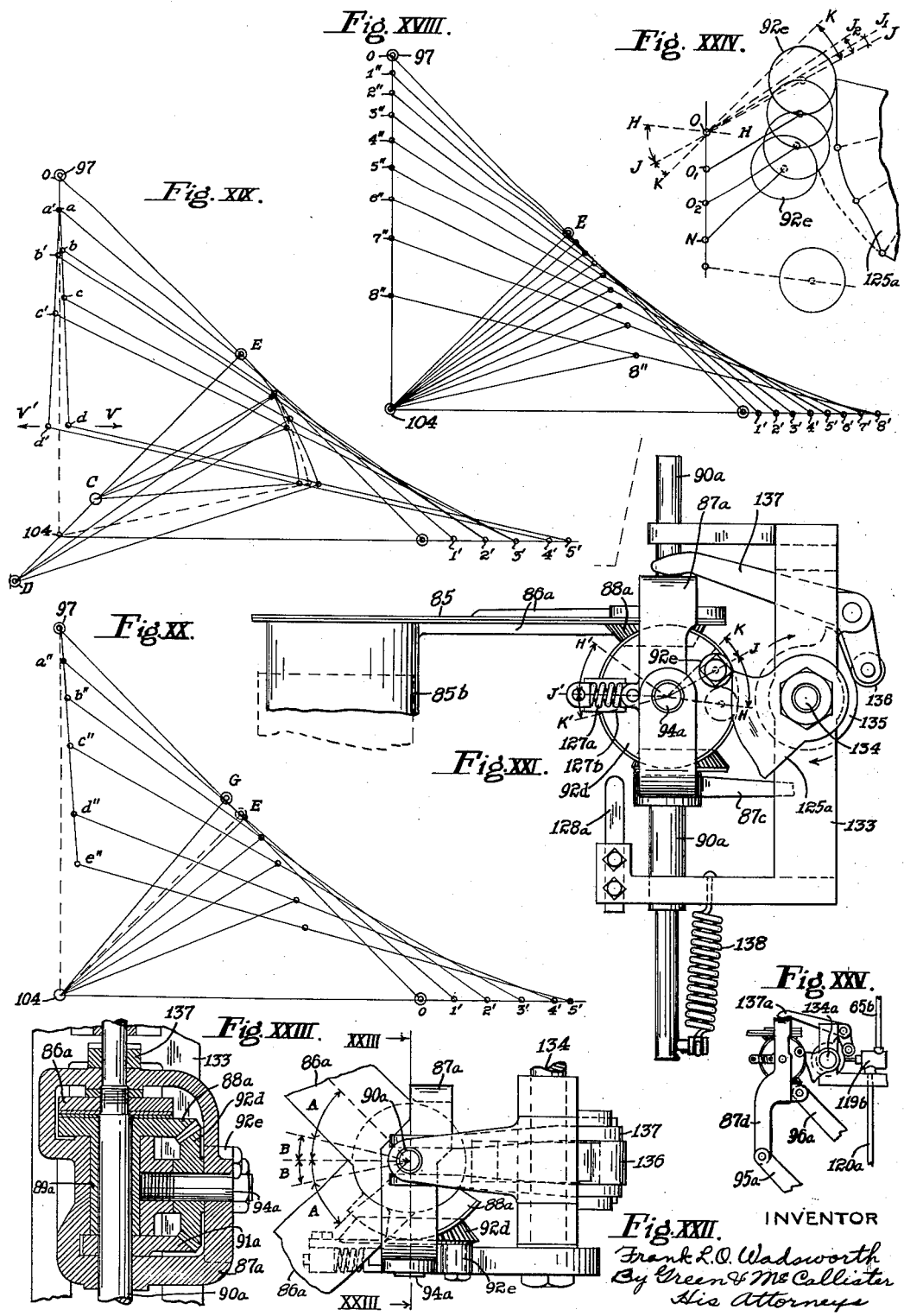

Nov. 30, 1937.   F. L. O. WADSWORTH   2,100,760
METHOD AND APPARATUS FOR FEEDING THERMOPLASTIC MATERIAL
Filed April 9, 1935   5 Sheets-Sheet 5
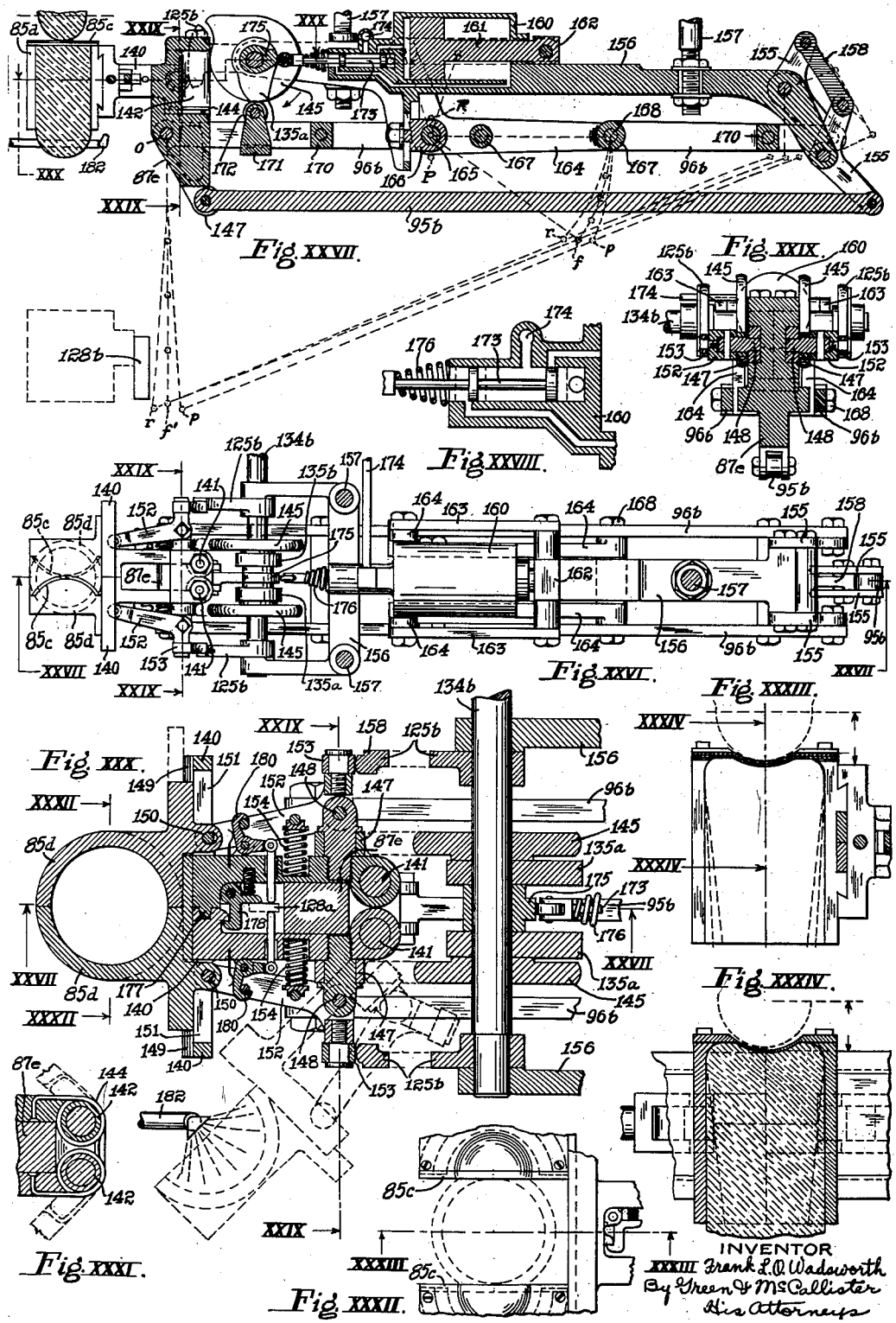

Patented Nov. 30, 1937

2,100,760

UNITED STATES PATENT OFFICE 2,100,760

METHOD AND APPARATUS FOR FEEDING THERMOPLASTIC MATERIAL

Frank L. O. Wadsworth, Pittsburgh, Pa., assignor to Ball Brothers Company, Muncie, Ind., a corporation of Indiana Application April 9, 1935, Serial No. 15,416

23 Claims. (Cl. 49—55)

My invention relates to the art of delivering a series of charges of thermo-plastic material, such as molten glass, to the molds or other receiving receptacles of a forming machine; and it is particularly directed to providing a very effective combination of a continuously operating high speed feeder, which will deliver a continuously flowing stream of glass of periodically varying cross section, and of an intermittently acting shear mechanism, which is adapted to sever the said stream, at predetermined intervals, without interrupting, or interfering with the free downward movement of the stream particles, and to deliver successively cut off preshaped charges at an accelerated speed to the receiving receptacles.

One of the primary features of the present invention is the delivery of a continuously flowing stream of glass under a constantly imposed external force, or combination of forces, which always supplements the action of gravity in accelerating the velocity of stream flow, and thus substantially increases its rate of discharge from the reservoir or parent body of molten material. This mode of procedure is essentially different from that followed in the use of "natural flow" feeders—where the only extruding force is that of gravity—and is also characteristically different from the operation of such types of "forced flow" feeders as have heretofore been used where the action of gravity is alternately aided and opposed by periodically reversed external forces (such as are produced either by the reciprocation of a "sticky" plunger, or by successively applied super-atmospheric and sub-atmospheric pressures), and the outflow of the molten material is therefore alternately accelerated and arrested, or even reversed, during these successive actions.

The purpose of this feature of my invention is to substantially increase the mean or average volume of outflow from any given size of delivery orifice—as compared with that obtained by gravity action alone (natural flow)—and to completely eliminate the loss of time, and other difficulties, which result from an intermittent stoppage or retraction of this outflow by the reversal of periodically applied external forces (forced flow). The attainment of these results greatly augments the capacity, (i. e., the speed of operation), of the feeder; and correspondingly increases the possible, or permissible, speed of the forming machine, which is supplied with glass therefrom; and it also facilitates the delivery of the molten glass to the receiving molds in a more uniform and homogeneous condition.

Another important object of my invention is to provide for periodically varying the magnitude, and the resultant effect, of the constantly imposed external force (or forces) and thereby altering the rate of forced discharge—and the resultant cross section—of the outflowing stream of molten glass. The purpose of this feature of the present improvements is to produce a regularly recurrent series of stream sections of enlarged diameter, which are connected by "necks" of somewhat smaller diameter, and which are adapted to be cut apart (preferably at the "necked" portions) to form a corresponding series of mold charges of controllable and predetermined size (mass) and/or shape.

Another purpose of these improvements is the provision of a cutting mechanism, for the continuously flowing stream, which will be capable of separating the successively formed sections thereof, without exerting any retarding action on the flowing material, and which may, if desired, be so operated as to even assist its downward movement at, or in, the zone of severance. An anciliary feature of this improved cutting mechanism is its capacity to shape the severed ends of the stream sections without modifying or interfering with, the continuous complemental action of the feeder assembly.

Still another feature of this invention is the provision of a cutting mechanism which is adapted to not only perform the functions last mentioned (supra); but which is also adapted to accelerate the downward velocity of the severed charge and deliver it to the receiving receptacle at a speed that is materially higher than that which it can acquire in a free fall (through the same distance); and to further impart to the downwardly moving mass a transverse component of movement in the direction of mold travel. The purposes of these features of improvement are; first, to avoid loss of time in delivery; second, to augment the momentum of the moving charge and thereby increase the compressing effect of its impact on the walls of the mold cavity; and third, to facilitate its delivery to a continuously moving receptacle.

An additional purpose of my present invention is to provide a form of accelerated delivery shear mechanism which is not only adapted to shape the oncoming lower end of the severed stream to a definite predetermined form, but is also capable of reshaping the upper end of the cut off section to a different contour from that imparted to it by the cutting operation per se, and to thus obtain a mold charge whose entire cross section, (both sides and ends), can be varied and controlled by the combined action of the continuous forced flow feeder and the accelerated delivery shear mechanism. The utilization of this feature of my improvements makes it possible to impart to the upper ends of the severed mold charges a substantially flat, or if desired a concave, surface:—in place of the rounded or tapered shape obtained by the use of the usual form of severing mechanism—and to thus eliminate any tendency of the upper end of the charge to lap or fold over on itself, when it is deposited in the receiving mold.

Other purposes and advantages of my improved mode of procedure, and of the combination of feeder and shear mechanisms which I have provided for its practice, will be made apparent, to those skilled in this art, by the appended description of various exemplary embodiments of my invention, which are illustrated in the accompanying drawings in which:—

Figure I is a longitudinal vertical section (partly in elevation) through the center of the forehearth and the delivery orifice of one form or embodiment of my improved feeder organization;

Fig. II is a rear elevation of a part of this organization;

Fig. III is a general plan view thereof;

Fig. IV is a horizontal section (on a reduced scale) on the plane IV—IV of Fig. I;

Fig. V is an enlarged detail section on the plane V—V of this same figure;

Fig. VI is another sectional elevation on the plane VI—VI of Fig. III, and illustrates a slight modification of the construction there shown;

Fig. VII is a vertical sectional elevation (similar to that of Fig. I) of a second illustrative embodiment of my present improvements;

Figs. VIII and IX are horizontal sections (on a reduced scale) on the respective planes VIII—VIII and IX—IX of Fig. VII;

Fig. X is a semi-diagrammatic plan view of a modified arrangement of driving mechanism for the feeder assembly;

Fig. XI is a side view of one form of my improved shear mechanism (which may be used with either form of feeder shown in Figs. I to VI or VII to IX, inclusive);

Fig. XII is a plan view of this mechanism;

Fig. XIII is a partial cross section on the vertical plane XIII—XIII of Fig. XII;

Fig. XIV is another partial cross section on the horizontal plane XIV—XIV of Fig. XIII;

Fig. XV is a broken section on the vertical plane XIII—XIII of Fig. XII; Fig. XVI is a composite vertical section—the upper part being taken on the plane XVI—XVI of Fig. XIII, and the lower part on the plane XVI—XVI of that same figure;

Fig. XVII is a detail section showing the action of the shear blades on the flowing stream of glass;

Figs. XVIII, XIX, and XX are diagrams illustrating the kinematic action of the link elements of my improved shear organization;

Fig. XXI is a side elevation of another form of cutting mechanism that exemplifies certain features of this invention;

Fig. XXII is a plan view of the construction shown in Fig. XXI;

Fig. XXIII is a vertical section on the plane XXIII—XXIII of Fig. XXII;

Fig. XXIV is a diagram of the action of certain parts of this construction;

Fig. XXV is a reduced scale view (in side elevation) of still another exemplary embodiment of my improvements.

Fig. XXVI is a plan view of another form of accelerated delivery shear mechanism which embodies my invention, and which presents certain individual features of its own;

Fig. XXVII is a vertical section on the plane XXVII—XXVII of Fig. XXVI;

Fig. XXVIII is an enlarged detail section on this same plane;

Fig. XXIX is a sectional elevation on the plane XXIX—XXIX of Figs. XXVI and XXVII (and Fig. XXX);

Fig. XXX is a composite section on the double (offset) plane XXX—XXX of Fig. XXVII;

Fig. XXXI is a horizontal section of a portion of this mechanism;

Fig. XXXII is a plan view of a special form of shear blade and guard cup assembly which is adapted to be used in conjunction with the construction shown in Fig. XXVII to XXXI inclusive;

Fig. XXXIII is a vertical cross section on the plane XXXIII—XXXIII of Fig. XXXII with the shear blades closed (as shown in Fig. XXVII); and Fig. XXXIV is another vertical cross section on the plane XXXIV—XXXIV of Fig. XXXIII (which corresponds to the plane XVII of Figs. XVI and XVII).

The feeder organization illustrated in Figs. I to V, inclusive, comprises a forehearth chamber, 1, which forms an extension of a main furnace or melting tank (not shown), and which is enclosed by a frame or "boot", that is made up of a relatively thin outer wall 2, of highly polished metal sheets, and a thick inner wall of refractory and heat insulating material. The floor of the chamber 1 is provided, near its front end, with a conical opening 3 which is in registry with the upper end of a sub-forehearth chamber 4 that is enclosed by a cylindrical sleeve 5 of refractory material; and the lower end of this sub-forehearth sleeve chamber (4—5) is partially closed by a removable ring bushing 6, that defines the size and shape of a delivery orifice F through which the flowing stream of glass is discharged in the following manner:

A rotatable and reciprocable plunger 7 is mounted in axial alignment with the opening 3 and the subjacent chamber 4, and is provided, at its lower end, with a double helical thread of large pitch, which acts as a continuously operating screw-pump-impeller element to force the surrounding mass of glass toward and out of the delivery orifice F. On the down stroke of the rotating plunger the molten material is subjected to three coacting and cooperative forces—i. e., the force of gravity, the end thrust of the rotating impeller, and the pressure exerted by the downwardly moving implement. On the upstroke the glass is subjected to two expulsive forces, (gravity and the screw impeller thrust), and to one retractive force—i. e., the lifting action of the upwardly moving "sticky" plunger—and, by properly controlling the relation between the rotary and the reciprocatory movements of the plunger, the second force (viz., the downward thrust of the revolving screw element) may be made to exceed the lifting force (of the upwardly moving implement); so that the action of gravity is at all times supplemented by an externally applied pressure that will not only prevent any arrest or retraction of the gravity flow, but will, on the contrary, increase it.

Under these conditions of operation, the molten glass will be expelled from the delivery orifice F in a continuously flowing unbroken stream; but the rate of delivery will be varied by, and in accordance with, the algebraic sum of the forces acting during the downstroke and the upstroke of the rotating member 7; and the diameter or cross section of the outflowing stream will therefore be periodically enlarged, (as the rotating screw impeller element moves downward), and diminished, or "necked", (as this element moves upward) to form a series of stream sections of the proper size and shape for severance into a corresponding succession of mold charges.

The moving implement 7 is preferably surrounded by a guard sleeve 8 whose lower end is immersed in the glass in the forehearth chamber and whose upper flanged end is held in sealed engagement with a recess in the forehearth roof by a hollow metal block 9 that is bolted down on upper wall of the forehearth frame 2. This guard sleeve prevents any escape of gases from the chamber 1 through the opening around the plunger 7, without interfering with its free reciprocation and rotation.

The upper end of the member 7 projects upward into the interior of the block 9 and is there rigidly secured to a metal cap 10, by means of the embedded bolt 11, and the external sleeve coupling 12, which is adapted to slide and revolve freely in a graphite bushing 14 that is removably mounted in the block 9. The cap 10 is detachably secured to a flanged coupling at the lower end of a coupling rod 15, whose length is somewhat greater than the overall length of the plunger assembly 7—10—12. etc., and which is detachably connected at its upper end to a drive shaft 16. This drive shaft is slidably, but not rotatably, engaged by the hub of a large spur gear 17, which is, itself, rotatably mounted on an overhead platform 18, that is adjustably supported by the four side and end posts 19—19, 20—20 of the forehearth frame 2.

The spur gear 17 is engaged by the lower member 21 of a compound pinion assembly 21—22, which is rotatably mounted on a stub shaft 24 that is clamped to a radially slotted, and angularly adjustable arm 25; and the upper element 22 of this compound pinion combination (21—22) is in mesh with another larger gear 26, which is secured to the upper end of a short vertical shaft 27, that is journaled in the platform support 18. The lower end of the shaft 27 carries a bevel pinion 28, which is engaged by the bevel gear 29 on the horizontal shaft 30 that is also rotatably mounted on the platform 18; and the shaft 30 is driven at a predetermined speed, from any suitable variable speed motor through the worm and worm wheel elements 32—33.

The shaft 30 carries a cam 35 which is adapted to engage a cam roller 36 that is mounted between the twin arms of lever 37, which is rockably supported on a movable fulcrum pin 38, and whose outer ends are flexibly connected to a ring 39 that is held loosely between the collars 40 and 41 on the shaft 16. The inner ends of the twin lever arms 37 are connected to a pair of tension springs 42—42, which serve to counterbalance the weight of the shaft supported parts 7—12—15—16—17, etc.; and to hold the roller 36 in operative engagement with the cam 35. The fulcrum pin 38 is carried by a link 44, which is positioned between the twin arms of the lever 37 (see Fig. V), and which is pivotally mounted on a second twin arm lever 45, that is supported, at its inner end, by a trunnion bearing on the depending leg of the L-shaped platform frame 18, and, at its outer end, by threaded bolt and hand wheel nut elements 46, 47, which are carried by a cross bar 48 secured to the posts 20—20.

The link 44 is connected at an intermediate point in its length, to a horizontal bar 50, whose outer end is engaged with an adjusting screw 51 that is loosely supported in another cross bracket 52 on the posts 20—20. The manual rotation of the screw 51 rocks the link 44 on its pivot support on the lever 45, and shifts the position of the fulcrum pin 38 in the grooves of the lever arms 37—37; thus altering the up and down movement of the plunger shaft 15, under the action of the cam 35; and the turning of the hand wheel nut 47 bodily lifts or lowers the lever-link assembly 37—44, and correspondingly alters the upper and lower limits of this reciprocatory movement. The rotative speed of the plunger shaft 15 and of the cam shaft 30 may be varied by changing the size of any one or all of the gears 21—22 and 26—(and correspondingly adjusting the position of the stub shaft 24 and of the associated arm support 25)—in the transmission gear train previously described.

It will now be apparent that the above described arrangement of parts will enable the machine tender to readily change both the range of the up and down movements of the rotating screw impeller 7, (by the use of the screw 51), and the position of that member at the top and bottom of its stroke, (by the adjustment of the elements 46—47); and that the speed of rotation of the said impeller—in relation to the cycle of reciprocatory action—may also be easily varied, within wide limits, by the adjustment of the various elements of the "change gear" transmission train. These several changes in the concurrent reciprocatory and rotary movements of the member 7 will result in corresponding variations in the relative magnitudes of the expulsion forces exerted on the glass, in and above the delivery orifice F', by the rotation of the screw impeller, and by its up and down movement; and will therefore regulate the comparative rates of discharge—i. e., the periodic increases and decreases—of the outflowing stream at different stages in the delivery cycle.

Fig. VI illustrates another form of construction, which is in all respects the same as the one above described except that one of the elements of the gear train, which connects the cam shaft 30 and the motor shaft 32 (e. g. the gear 26) is detachably connected to its associated shaft support (e. g. the shaft 27 by means of a friction disc clutch 55, which is operated by a bell crank lever 56 that is pivotally mounted on the platform 18, and is engaged by a face cam 57 on the worm wheel 33;—the contour and positioning of this cam (57) being such that the clutch 55 is engaged when the plunger 7 is approaching the end of its downward movement, and is disengaged at, or near, the termination of its upward movement; so that this member is only rotated while it is being lifted. Under such conditions of operation the glass in the delivery chamber 3—4 is subjected to only two extrusion forces during the downward (and non-rotative) movement of the member 7; and to two positive and one negative force—viz. the force of gravity, the screw thrust of the rotating impeller elements and the lifting action, or frictional drag of the rising plunger— during the reverse upward movement thereof. The combined effect of these superimposed forces is to subject the glass in and above the delivery orifice to a continuous, but periodically varied expulsion pressure, which will correspondingly vary the rate of discharge of the outflowing stream, but which will prevent any arrest or retraction thereof during any stage of the delivery cycle.

In the construction illustrated in Figs. VII to IX inclusive, the rotating and reciprocating screw impeller 7a is positioned above, and partly within, a conical opening 3a—which is formed in the floor of the main forehearth chamber 1a, and in the adjacent portion of the sub-forehearth block 5a—and is extended upwardly through a conical guard sleeve 8a, that is supported by the forehearth roof and serves to prevent any outflow of forehearth gases around the sides of the moving impeller member. The upper end of this member (7a) is detachably clamped to a metal cap 10a, by means of the embedded bolt 11a and the keys 58—58; and this cap is, in turn secured to a flanged coupling 15b which is keyed to the lower end of a shaft 15a, and which is rotatably and slidably mounted in a ball bearing 14a that is supported on the vertical posts 19a—19a of the forehearth frame (2a) by the cross bar 18b. The upper end of the shaft 15a is connected, by a flange coupling 15c, to another short shaft 16a which is slidably, but non-rotatably, engaged with the hub of a worm wheel 17a, that is journaled in an overhead platform 18a, (which is also supported on the vertical posts 19a—19a of the forehearth frame); and this shaft (16a) is also rotatably mounted in a thrust bearing sleeve 16b which is threaded into the platform 18a, and which can be turned, by means of the pulley and cord connections 46a—47a, so as to raise or lower the suspended members 15a—17a, and thus vary the operative position of the tapered screw impeller element in the coned openings 3a.

The worm wheel 17a is continuously revolved at a controllable speed by a worm 21a on the variable speed motor shaft 32a, which is journaled in suitable bearings on the platform member 18a; and this shaft (32a) is also provided with a second worm 21b, which is engaged with a worm wheel 21c that is secured to a spur gear 21d and is revolubly mounted on the stationary journal bolt 21e. The gear 21d is engaged by one member (21f) of the compound change gear assembly 21f—22a which is rotatably mounted, as a unit, on the stud bilt 24a that is secured in the slotted arm of an angularly adjustable change gear bracket 25a; and the gear 22a is, in turn, engaged with another gear 26a which is keyed to the horizontal shaft 27a, that is also journaled in suitable bearings on the platform member 18a, and carries a cam element 35a, whose operative function will be described later.

The lower end of the screw impeller chamber 3a is connected, by the lateral passageway 3b, with a delivery chamber 4a, which is formed in the sub-forehearth block 5a and in the over-lying portions of the main forehearth floor. The lower end of this chamber is partially closed by a removable ring bushing 6a, which defines the size and shape of the delivery orifice F; and the upper end thereof is covered by a refractory bell shaped block 60 which is seated on the forehearth floor, between two inwardly projecting blocks 61—61 of the forehearth side walls, (see Fig. VIII) and is held in sealed contact therewith by a hollow plug 62, that extends up through the forehearth roof and is covered by a metal cap 63 on the upper wall of the enclosing boot 2a.

The interior of the bell 60 is connected through the hollow plug 62 with a pipe 64 which is screwed into the cap 63 and extends upwardly to a valve casing 64a that is supported on the platform 18a and is supplied with compressed air, (or any other suitable fluid at super-atmospheric pressure), through a conduit 65. The valve casing 64a contains a reciprocatory needle valve 66, which is operatively connected with the cam 35a by a slotted lever 67 that is rockably supported on a movable fulcrum pin at the upper end of an angularly adjustable link 68. The lower forked end of this link is engaged by a grooved thumb nut 69 on the pivoted link bolt 70; and by turning this nut the fulcrum support for the cam actuated lever 67 can be shifted to the right or left, and the opening movement of the needle valve 66 correspondingly varied and controlled. The cap 63 is provided with a vent opening 72 whose area can be varied, by a manually adjustable plug 73, to permit of a restricted escape of air from the chamber 4b when the pressure therein exceeds that of the external air.

The operation of the last described feeder organization is in all respects analogous to that of the one illustrated in Figs. I to V, inclusive. The continuously revolving screw impeller 7a draws the glass from the forehearth into the conical chamber 3a, and expels it therefrom, through the passage 3b, into the delivery chamber 4a under a pressure which is determined and controlled in part by the depth and (or) the angular pitch of the impeller threads; in part by the vertical positioning or adjustment of the conical impeller head in the surrounding well 3a; and in part by the speed of rotation of the impeller shaft (15a). This pressure is continuously exerted on the glass in and above the delivery orifice F, and supplements, or is supplemented by, the action of gravity in producing a continuous unbroken outflow of molten material therefrom. The rotating cam 35a periodically opens (lifts) the needle valve 66 and admits a predetermined quantity of compressed fluid to the chamber 4b, and the pressure of this fluid on the surface of the glass in the delivery chamber 4a accelerates its rate of discharge from the delivery orifice F, and correspondingly expands the diameter of the outflowing stream. When the continued rotation of the cam 35a permits the needle valve to be closed (by the action of the return spring 35b) the pressure in the chamber 4b immediately drops, by reason of the continuous escape of air through the restricted vent passage 72, and the rate of discharge from the orifice F is correspondingly decreased or decelerated, thus producing a "necking" or contraction of the continuously flowing stream. I thus obtain a series of successively enlarged stream sections, which are suitable for severance into a corresponding succession of mold charges; but there is never any cessation or arrest, or retraction (reversal) of the outflowing stream. I thus eliminate the loss of time, and the attendant decrease in the speed of operation, which results from periodically stopping and/or reversing the downward movement of the glass in and below the delivery orifice,—which is a characteristic defect of all "suspended gob" feeders of both the "natural flow" and the "forced flow" type—and I further avoid or minimize the variations in temperature, or in physical homogeneity, which are produced by either a complete checking, or a substantial stoppage, of the outflow of molten material.

The size and shape of the successively formed stream sections, or mold charges which are delivered by my improved feeder organization may be varied and controlled, while the feeder is in continuous operation; first by varying the speed of rotation of the screw pump impeller 7 or 7a (by a rheostat control of the driving motor); second, by altering the relative position of the impeller with respect to the pump well 3 or 3a (by means of the nut and screw elements 46—47 or 46a—47a); and third, by varying the magnitude, or the manner of application of the supplemental extrusion forces which are periodically imposed on the glass in the delivery chambers 4 and 4a.

In the construction shown in Figs. I to V, inclusive, this last mentioned control is obtained by altering the stroke, and consequently, increasing or decreasing the reciprocatory velocity of the vertically moving plunger member 7 (by the adjustment of the screw 51 and the shifting of the fulcrum pin support 38 for the oscillating lever 37); and in the construction last described it is obtained by varying the super-atmospheric pressure in the bell chamber 4b, either by adjusting a manually controllable throttle or pressure reducing valve in the conduit 65, or by varying the opening of the needle valve 66 (by the turning of the screw nut 69), or by adjusting the vent control plug 73.

The periodically varied rate of outflow from the delivery orifice F can also be regulated and controlled; first, by changing the size of the bushing 6 (or 6a) and thus changing the ratio between the area of the inflow passageway around and below the rotating pump impeller, and the outlet opening (F); second, by changing the gear transmission ratio between the impeller shaft 15 (or 15a), and the cam shaft 30 (or 27a)—as already explained; third, by changing the form of the cams 35 or 35a; and fourth, by changing the length (depth) of the removable forehearth 5 (Fig. I) and thereby increasing or decreasing the gravity head of the glass above the delivery orifice F; but these last mentioned changes can only be made when the feeding operation is temporarily interrupted.

The rate and character of the continuous outflow of glass from the orifice F may also be varied by controlling the forward movement of the molten material in the forehearth chamber and by regulating the temperature therein. The forward flow of the glass is controlled by a vertically movable gate or baffle block 75 (or 75a), which can, if desired, be lowered to a point where the flow thereunder is so restricted that the level of the glass in the front part of the chamber 1 (or 1a) will be substantially lower than that in the main tank, or which can, if necessary, be used to completely cut off this flow when the parts 5, 6, 7, 8, etc., are to be removed and replaced by others. This block projects through the roof of the forehearth, and is supported thereon by the angle plates 76—76 which are clamped together against the sides of the block and rest on a thick pad of asbestos (or other suitable packing material) that seals the openings around the sides and edges of the vertically movable member and prevents any escape of the forehearth gases therethrough (see Fig. I).

In the construction illustrated in Figs. I and IV the main forehearth chamber is maintained at the desired temperature by suitable burners, which project through openings 78 in the side walls, and which are arranged at such angles as to direct streams of burning gases forwardly into the space between the guard sleeve 8 and the adjacent semi-cylindrical wall of the forehearth chamber, from which they are deflected rearwardly toward and through a window opening 79 in the block 75 and then onto the main tank chamber. The subforehearth sleeve block 5 is heated by an induction or resistance coil 80, which is mounted in the annular space between the sleeve 5 and the outer wall of the subforehearth structure, and which is supplied with current from any suitable source of electric energy.

In the construction shown in Figs. VII, VIII and IX both the subforehearth and the main forehearth are heated by a single set of burners 81, which are arranged to direct the streams of burning fuel into an oval annular space 82 between the sub-forehearth block 5a and the adjacent sub-forehearth wall 5b (see Fig. IX), from which they pass upwardly through an opening 83 in the floor of the main forehearth and between the bell 60 and the adjacent front wall thereof, (see Fig. VIII), and thence rearwardly past the hollow plug and guard sleeve members, 62—8a, to and through the opening 79a in the baffle block 75a.

Fig. X illustrates another arrangement of driving mechanism which permits the relative speeds of the pump shaft 16a and of the cam shaft 27a to be independently varied without interrupting the continuous operation of the feeder. In this arrangement the motor shaft 32a—which serves to revolve the pump impeller shaft 16a,—is driven by one variable speed motor $M_1$; and the worm shaft 32b, which is directly engaged with the cam shaft worm wheel gear 26b, is separately driven by an auxiliary variable speed motor $M_2$. The use of this auxiliary motor $M_2$ eliminates the necessity of providing a train of change gears to control the relative speeds of the pump impeller and of the "timer" cam shafts and simplifies the operating mechanism. A similar two motor control can of course be used in conjunction with the feeder assembly illustrated in Figs. I to VI inclusive.

The interposure of a friction clutch connection such as is shown in Fig. VI, between the motor driven shaft 32 (or 32a) and the pump impeller shaft 16 (or 16a); and the actuation of this clutch at each revolution of the "timer" cam shaft 30 (or 27a); affords still another means for varying the relative magnitudes of the extrusion forces which are effective in controlling the periodically varied rate of flow from the delivery orifice F; and in thus controlling the volume and shape of the successively formed stream sections or mold charges. It is of course obvious that other means (e. g. a pair of suitably proportioned elliptical gears) may be used to periodically vary the speed of rotation of the screw-pump-impeller during each cycle of the forced flow feeding action.

The above described type of continuous forced flow (non-retractive) feeder may, of course be used with various forms of "superspeed" shear mechanisms which are adapted to effectively sever the continuously flowing and periodically enlarged stream into a series of mold charges—(preferably by cutting this stream at its "necked" portions, i. e., in the neighborhood of the plane S—S of Figs. I and VI)—but in order to obtain the most rapid and efficient operation of my improved feeder organization, it is desirable to effect this severance in such a manner that it will not, in any way retard, or interfere with, the unrestrained downward movement of the stream particles either in, or above, or below the plane of severance, but may on the contrary be so carried out that it will actually assist or accelerate this downward movement. The problem of doing this is materially different from any which is presented in cutting the stream delivered by a "natural flow" feeder—where the downward movement of the stream particles can never be greater, (and is usually substantially less) than that of a falling body, (because gravity is the only accelerating force which is exerted on the viscous mass of flowing material)—; and it is also materially different from any which is encountered in the operation of an intermittent "forced flow" feeder of the periodically retracted or "suspended gob" species, where the downward flow of glass is either arrested or reversed at the time the stream is cut.

Several exemplary forms of shear mechanisms are here presented as a part of my present improvements—(which as previously indicated, relate broadly to the successive formation, severance and delivery of a series of mold charges by the combined cooperative action of a continuous (non-retractive) forced flow feeder, and of a non-retarding and/or accelerated delivery shear organization)—and it will be understood that any one of these exemplary forms may be associated, and used in combination with, any one of the previously described feeder assemblies (Figs. I to X, inc.).

The construction illustrated in Figs. XI to XVI inclusive, comprises a pair of "cats eye" shear blades 85—85, which are adjustably attached to arms 86—86, that are coaxially mounted in a head 87. One of these arms (86) is secured to, or made integral with, a segmental bevel gear 88, and is provided with a downwardly extending tubular shaft 89 which is journaled in the head 87; and the other arm is keyed or clamped to the upper end of a solid shaft 90 which is rotatably mounted in the tubular shaft 89 and in the lower part of the head 87, and which is provided with a second bevel gear segment 91. The two gear segments 88—91 are interconnected by a bevel pinion 92, which is provided with an elongated sleeve hub 93 that is journaled on a fixed stud bolt post 94 carried by the head 87. The rotation of the pinion 92 turns the associated elements 86—88—89 and 86—90—91 in opposite directions about the common axis of the shafts 89—90, and moves the shear blades 85—85 either toward or away from each other.

The head 87 is supported on the upper ends of three parallel links 95—95 and 96, which are respectively engaged by the cross pintle bolt 97 that passes through the lower portion of the head 87, and by the pivot pin 98 in the outer end of a bracket member 99 that is screwed into, and forms a substantially integral part of, the tubular stud bolt post 94. The lower end of the three parallel links (95—95—96) are pivotally attached to a reciprocable cylinder 100, that is slidably mounted on a tubular piston rod 102 that is rigidly clamped in fixed position on the base frame 103; and the central points of the three links, 95—95, and 96, are respectively coupled to pintle bolt supports 104 and 105 on the base frame (103) by the two pairs of twin arm guide links 106 and 107.

The tubular piston rod 102 carries a fixed piston 108, that is slidably engaged with the movable cylinder 100; and also carries a reciprocable piston valve 109 which is provided with two cup-shaped heads 110—110 that engage with the end portions of the hollow rod 102, and with an intermediate head 111 that is positioned between the side planes of the piston member 108. The lower halves of the heads 110 are provided with a row of port openings 112, which are moved into and out of registry with cooperating ports 114 in the hollow rod 102, by the endwise movement of the valve 109. The tubular member 102 is also provided with two sets of atmospheric exhaust ports; 115—115, which are also opened and closed by the reciprocation of the valve member 109, and with radial ports 116—117 which open into the cylinder 100 on each side of the piston head 108.

The port openings 114 are in constant communication with a passageway 118, which is formed in the base plate 103, and which is connected to the casing of a reciprocable piston valve 119 by the pipe 120. The valve member 119 is actuated by a cam 121 which is secured to the cam shaft 30 (or 27a) of the feeder organization (supra), and which serves to control the flow of motive fluid from the conduit 65a to the pipe 120, or its escape therefrom to the atmosphere. In the position of the parts shown in Figs. XI, XII, and XV, the cylinder 100 is at the extreme left hand end of its stroke; the ports 114 at that end of the piston rod 102 are closed; and the adjacent exhaust ports 115 are open. In this position the corresponding supply and exhaust ports 114 and 115 at the opposite (right hand) end of the hollow piston rod, are respectively closed and open, but the pipe 120 is also open to the atmosphere, and both ends of the cylinder 100 are therefore connected, through the ports 116 and 117 with the outside air. When the rotation of the cam 121 permits the valve 119 to be raised—by the pressure in the conduit 65a and also by the return spring 119a—motive fluid will be admitted to the pipe 120 and, through the open ports 112 and 117 to the outer (right hand) end of the cylinder 100, and will move the latter to the right. This will in turn rock the interconnected link elements 95—106, and 96—107 on their pintle bolt supports 104 and 105 and will move the head 87 downwardly.

The bevel pinion 92 is provided with a cam block 92a which is journaled on its sleeve hub 93, and is normally held in engagement with a stop block 92b, on the face of the pinion (92), by the spring 92c. As the head 87 is moved downward the cam block 92a is brought into engagement with a fixed cam 125, which is adjustably supported on a vertical post 103a that extends upwardly from the base frame 103; and the engaged elements 92a—92b—92 are rotated in a clockwise direction, on the stud bolt support 94, to move the shear blades 85—85 toward each other and sever the stream of glass flowing from the delivery orifice F of the feeder assembly. It is obvious that this action involves concurrent downward (axial) and transverse (cutting) movements of the shear blades; and that the severing operation will be performed without in any way retarding or interfering with, the forced flow of the stream particles when the axial component of shear blade movement—which can be readily controlled by the pressure and rate of admission of the motive fluid in and to the outer end of the cylinder 100—is equal to the velocity of stream flow in the cutting zone. By somewhat increasing the axial speed of shear blade movement—as compared with that of the flowing stream—the severing operation can be made to actually accelerate the downward movement of glass in both sides of the transversely moving blades, and thus assist in shaping the severed ends to a predetermined form or contour.

The shaping action of the downwardly and transversely moving cutting elements (85—85) may be further regulated and controlled by varying the ratio of the concurrent vertical and horizontal movements of the shear blades. This is readily accomplished by changing the form or edge contour of the cam 125. As here illustrated, this cam is so shaped that in the preliminary stage of its action the shear blades are rotated through an angle A (from their full open position to the dotted line position of Fig. XII) while the head 87 is moved downward through the distance M (Figs. XVI and XVII). This preliminary movement brings the edges of the cutting elements into contact with the surface of the flowing stream. During the succeeding period of severing action the blades 85—85 are rotated through the angle B (to their completely closed position) while the head 87 is moved downward by the additional amount N; but in order to shape the severed end of the flowing stream to an approximately hemispherical contour, (in the plane XVII), the initial transverse angular movement $B_1$ of the shear blades is very slight—as compared to the corresponding axial travel $N_1$ of the head 87—and is then gradually and rapidly accelerated during the final stage of the cooperative movements $B_1$ to $B_2$, and $N_1$ to $N_2$.

The parts are so proportioned that when the head 87 has reached the end of the movement M+N, the cam block 92a is disengaged from the cam 125; and the shear blades 85—85 are then held in their closed position by the double action spring 127, which has then been moved to the position shown in the lower part of Fig. XVI. The downward motion of the head 87 is then rapidly accelerated by the continued movement of the cylinder 100 toward the right, and by the characteristic action of the linkage assembly 95—106 (or 96—107), which is diagrammatically indicated in Fig. XVIII, where the points 0—1'—2' to 8', and 0—1''—2'' to 8'' represent successive correlative positions of the head and cylinder elements 87 and 100. This rapidly accelerated downward movement of the closed shear blades imparts a corresponding velocity to the cut-off charge, which is materially greater than that of free fall;—this increased velocity being, of course, regulated and controlled by the pressure of motive fluid in the right hand end of the cylinder 100.

In order to keep the severed charge in alignment with the closed blades 85, 85—and to also prevent any undue flattening of its upper end by the accelerating pressure thereon—a pair of semi-cylindrical guard cups 85a—85a, having hemispherical upper ends, are attached to the shear blade arms 86—86, and are so proportioned as to lightly embrace, but not compress or distort, the sides of the charge and to guide it in its accelerated downward movement.

As the moving members approach the end of their outward and downward travel the head of the cylinder 100 engages a pin 100a, which is slidably mounted in the base frame 103, and rocks a lever 100b, which is pivotally supported thereon, to the right; thereby shifting the reciprocable piston valve 109 in the same direction and reversing the port connections 112 and 115 at the opposite ends of the hollow piston rod 102. This opens the right hand end of the cylinder to the atmosphere and puts the opposite end thereof in communication with the motive fluid pipe and passage 120—118; thus first cushioning, then arresting, and finally reversing the movements of the parts 87—95—100, etc. Since the terminal velocity of the downwardly moving parts 85—85a—87, etc. is high, and these parts have considerable mass, it is desirable to assist the cushioning and reversal of the downward movement by the use of highly elastic springs 103a—103b which are adapted to engage the lower ends of the head and cup members 87 and 85a at the lower end of their travel.

In order to open the connected shear blade and guard elements 85—85a before the downward movement is completed—and thus completely release the mold charge from any decelerating restraint on its continued fall under the velocity already imparted to it—I provide a tapered finger 128, which is adjustably mounted in the base plate 103, and which is adapted to enter a notch 130, in the overlapping edges of the shear blade arms 86—86, and force them apart until the double acting spring 127 passes the dead center point; after which this spring acts to complete the opening movement. The released charge is then permitted to move on downward through the coil 103b and through an opening in the base plate 103, and is projected into the receiving receptacle therebeneath at the maximum velocity imparted to it by the above described action of the accelerated delivery severing mechanism.

In the return upward movement of the parts 87—95—106 etc. the valve 119 is held in its raised position during the first part of the travel of the cylinder 100 to the left; and is then moved downward until it closes the opening to the pipe 120, and thus traps the already admitted motive fluid in the left hand end of the cylinder and in the connected passage and pipe chambers 118-20. The completion of the return movement to initial position is accomplished by the expansion of this trapped fluid; and at the end of this movement the projecting boss on the left hand cylinder head engages an outwardly projecting lug 100c on the valve head 110, and moves the valve 109 to the position shown in Fig. XV. This again opens communication between the pipe 120 and the right hand end of the cylinder 100, but the amount of residual fluid remaining in the passage 118 and the pipe 120 is now so small that it will not exert any material actuating pressure on this end; and if desired the cam 121 may be so shaped that the valve 119 is depressed and the pipe 120 thus opened to the atmosphere as soon as the valve 109 is moved to the left. The expanded fluid in the inner end of the cylinder chamber (100) is partially trapped therein, by the covering of the adjacent piston rod port 115 by the overlying hub of the cylinder head, and serves to hold the shear head 87 and its associated parts in their initial elevated position, until the cam 121 permits the valve 119 to be again raised and reopen the connection to the motive fluid conduit 65a.

In the return upward movement of the shear head 87 the pivoted cam block 92a is engaged by the lower end of the cam 125 and is rocked in a counterclockwise direction on the gear hub 93 until it passses the said cam, and is lifted above it; after which it is returned to normal engagement with the gear lug 92b by the spring 92c.

This completes the cycle of severing and of accelerated delivery action.

It is sometimes desirable to impart to the severed and downwardly projected mold charge a lateral or transverse component of movement in the direction of mold travel, so as to facilitate the delivery of the charge to the receiving receptacle while the latter is in motion. This is most effectively accomplished in my improved delivery mechanism by shifting the position of the pintle bolt supports 104 and 105 for the guide link arms 95 and 96. When the centers of these pintle bolts are at the intersection of the vertical and horizontal lines through the pivot connections at the ends of the links 95 and 96 the head 87 moves parallel to itself along the vertical line 97, 104. When these centers are shifted inwardly to shorten the guide arms 106 and 107—e. g., when the pivot bolt support 104 is moved to the position C of Fig. XIX—the head member 87 will still move parallel to itself but will travel along the curved line 97—a—d. When the pivot bolt centers are moved outwardly and the link arms 106 and 107 are correspondingly lengthened—e. g., when the pivot bolt 104 is moved to the position D of Fig. XIX—the travel of the head 87 will be along the curved line 97 a'—d'. The downward movement of the shear blade elements 87—85—85a in the curved path, 97—d or 97—d', will impart to the severed charge a horizontal component of velocity, V or V', which will be controlled by the amount of shift of the pintle bolt supports 104 and 105, and which can be directed to the right or the left along the line of travel of the receiving receptacles—in the plane XIII—XIII of Fig. XII—so as to eliminate any relative lateral movement of the downwardly projected charge with respect to the horizontally moving mold.

The result last described can also be obtained by shifting the points of connection between the outer ends of the guide arms 106 and 107 and the associated parallel links 95—95 and 96. If, for example, the connection between the arms 106 and the links 95 as moved from the point E to the point G (see Fig. XX) the path of travel of the shear blade assembly is changed from the straight line movement 97—104 to the curved line movement 97—a'' xxxx e''. By shifting the point E in the opposite direction the path of travel of the head will, of course, be inclined to the left by a corresponding amount.

Figs. XXI, XXII and XXIII illustrate another embodiment of my improved shear mechanism. In this construction the parts 85b—86a—88a—89a—90a and 91a correspond in all material respects with the correspondingly numbered elements of the previously described assembly, (see Figs. XIII and XIV), and do not therefore require further description. The head 87a on which these parts are mounted is of an open box shaped form, and is provided on one side with a stud shaft support 94a which carries the bevel pinion 92d that serves to interconnect the upper and lower bevel gear segments 88a and 91a and to concurrently rotate the shear blade arms 86a—86a in opposite directions around the axes of the concentric shafts 89a—90a.

The shaft 90a projects for some distance beyond the top and bottom faces of the box shaped head 87a and is slidably mounted in the projecting arms of a U-shaped bracket 133, that is, secured to an adjacent portion of the forehearth boot (2 or 2a). The bifurcated vertical leg of this bracket (133) carries a cross shaft 134 which is connected to, and revolves at the same speed as, the cam shaft 35 (or 27a) of the feeder assembly, and which is provided with a cam 125a that is adapted to engage, at suitable intervals, with a cam roller 92e on the bevel pinion 92d and thereby move the shear blades 85b—85b toward each other. The shaft 134 is also provided with a second cam 135 which is positioned between the inner faces of the bifurcated bracket 133, and is adapted to engage a cam roller 136 that is rotatably mounted between the twin arms of a bell crank lever 137. This lever (137) is pivotally mounted on the bracket 133 and is engaged at its outer end with the upper face of the shear head 87a.

The operation of this last described mechanism is as follows: When the parts are at rest, the shear head 87a is normally held in its raised position by the tension spring 138; and the shear blades 85b—85b are held open by the two way spring 127a. During this period of inactivity or rest, the axis of the spring 127a and the center of the cam roller 92e occupy the dotted line positions H' and H of Fig. XXI. When the rotation of the shaft 134 brings the advancing edge of the cam lobe 125a into engagement with the cam roller 92e the pinion 92d is revolved through the angle H—J, and the shear blade arms are correspondingly moved toward each through the angles A—A (see Figs. XXI and XXII). This rotary movement brings the edges of the cutting elements into close proximity to the surface of the flowing stream of glass; and the cam 135 then comes into action to rock the bell crank lever 137 on its pivot support and initiate the downward movement of the head 87a (and its associated parts) on its shaft bearings in the bracket 133. This downward movement cooperates with the continued rotation of the cam 125a in effecting a further rotation of the bevel pinion 92d through the angle J—K, and completing the closing movement of the shear blades;—the ratio between the axial and the transverse (cutting) motion of the severing elements being controlled and determined by the edge contours and the phase relationships of the two cams 125a and 135. As shown in Fig. XXIV (diagram) the arrangement is preferably such that the final angular movement through the arc J—K is progressively accelerated with respect to the concurrent downward movement through the distance O—N, (as indicated by the successive coincident positions J—O, J₁—O₁, J₂—O₂, K—N), so as to shape the severed end to such a form as is shown in Fig. XVIII; but it is apparent that the arrangement may be varied so as to obtain any desired relationship between the concurrent axial and lateral movement of the cutting edges.

As soon as the downward movement of the head 87a has carried the cam wheel 92e below the path of action of the cam 125a (at point N of Fig. XXIV) the angular movement of the bevel gears and shear arms is arrested, and the shear blades are held in their closed position by the two way spring 127a whose axis has now passed the dead center position of Fig. XXI and occupies the dotted line position K'. The downward movement of the head 87a, and of its associated parts, continues under the action of the cam 135—preferably at a somewhat accelerated speed—until the closed shear blades have been carried away from the oncoming end of the severed stream, and the bevel pinion 92a is then rotated in the reverse (clockwise) direction by the engagement of the gear lug 127b (to which the outer end of the two-way spring 127a is pivotally attached) with an adjustable post 128a that is bolted to the lower arm of the U-shaped frame 133. This opens the shear blades, and as soon as this occurs the continued rotation of the shaft 134 moves the raised lobe of the cam 135 out of engagement with the cam roller 136 and the head 87a is then returned to its initial raised position by the spring 138.

In order to prevent any rotation of the reciprocable member (87a) under the edge thrust of the revolving cam 125a, and to also assist in maintaining the desired alignment between the axis of the stream and the centers of the guard cups 85c—85d, I provide the head (87a) with a laterally extending arm 87c whose outer end is slidably engaged between the inner faces of the bifurcated bracket support 133. The downward movement of the head, under the action of the cam 135, may, if desired, be effected by the direct engagement of that revolving member with this guide arm (87c); but I prefer to use the pivoted bell crank element 137 for this purpose because it permits of the use of a cam member of smaller diameter, and also affords another means of changing the ratio between the axial and the transverse movements of the shear blade elements. From the foregoing description it is apparent that my improved shear mechanism (e. g. Fig. XXI) is designed to carry out a procedure in which at least some portion of the charge shaping operation is accomplished by predeterminedly controlling the application of the severing forces transversely of the elongated mass or flowing stream, while at the same time varying in a predetermined relationship, the point of application of the forces longitudinally of the mass. Stated differently, the shaping of the lower end of each charge is effected by controlling the transverse movement of the shear blades and their axial movement relatively to the particles of the mass subjected to the severing forces.

In the form of construction shown in Figs. XXI, XXII and XXIII only a slight initial acceleration is given to the cut-ward charge, because of the limited range of downward movement beyond the plane of shear blade closure. But this movement can be continued to any extent desired by the use of the modified form of construction shown in Fig. XXV, in which the head 87d—(that is in all essential respects the same as the one shown in the three preceding figures)—is movably supported on a triple parallel link assemblage (95a—96a) like that previously described. In this case the shaft 134a is provided with a third cam which controls the movements of a "timer" valve 119b that controls the flow of motive fluid to the actuating cylinder of the parallel link assembly; and this cam is so set that motive fluid is admitted to the pipe 120a, (which corresponds to the pipe 120 of Figs. XI—XIa, XII and XV) just before the lever 137a ceases to act. The downward movement of the head 87d, which has been controlled during the severing operation by the lever 137a (in the manner already explained), is then continued by the action of the parallel link system (as described in connection with the construction of Figs. XI to XIV inclusive) until the desired acceleration (and lateral velocity) has been imparted to the cut-off charge; and the head 87e and its associated parts are then brought back to initial position by the return movement of the link system.

In the construction shown in Figs. XXVI to XXXIV inclusive each pair of cooperating shear blade and guard cup elements 85c—85d is reciprocably mounted as a unit, on the short leg of an L-shaped arm 140 which is pivotally supported by a vertical pintle bolt 141 that passes through an elongated hub 142 at the inner end of the arm 140 and is rigidly secured in the head 87e. The arms 140 are normally held apart—in the open position indicated by dotted lines in Fig. XXX—by a twin coil spiral spring 144 which passes around the lower ends of the hub members 142 and whose extremities are attached to intermediate points of the arms (see Fig. XXXI); and they are moved symmetrically toward each other—to the closed position shown in Figs. XXVI to XXXIV, inclusive—by two cams 145—145 which are attached to the revolving shaft 134b and which are adapted to engage with cam rollers 147—147 that are journaled on stud bolt supports 148—148 on the hubs 142—142.

Each shear blade is provided with a curved cutting edge (see Fig. XXVI) and is adjustably secured to the upper end of the associated guard cup 85d which is provided on one side with a V-shaped gib that slides in suitable guideways 149 on the contiguous face of the arm 140 and which is also provided with a lug 150 that projects through a slot 151 therein; and this lug is flexibly coupled—by a pin and slot connection—to the outer end of a twin arm bell crank lever 152 that is pivotally mounted on the head of the stud bolt 148. Each of these bell crank levers is provided with a cam roller 153 which is journaled in the short arm thereof, and which is adapted to be engaged, at suitable intervals, by a single lobed cam 125b that is also secured to the shaft 134b. During the periods when these elements 153 and 125b are out of engagement, the interconnected members 85d and 152 are held at the outer limits of their oscillatory or reciprocatory movements by the compression springs 154 that are interposed between the L-shaped arms 140 and the bifurcated levers 152.

The head 87e, which carries the parts 140—152 etc., is movably supported on three "parallel links" 95b, 96b—96b, whose inner ends are pivotally connected to the head 87e and whose opposite or outer ends are coupled to a pair of rocking guide arms 155—155 which are journaled on a rigid frame 156 that is adjustably supported in any suitable manner (e. g. by the posts 157) on the forehearth boot; and which are themselves connected—e. g. by the bar 158—so as to move in synchronism and in parallelism with each other. The frame 156 carries a cylinder 160 which is provided with a reciprocable piston rod member 161 whose outer end terminates in a cross head 162 that slides in suitable guideways on the frame; and this cross head is connected, by the connecting rods 163 to the upper ends of a pair of bell crank levers 164 which are keyed to a cross shaft 165 that is journaled in an adjustable block 166 secured to the frame 156. The lever members 164 are also cross connected by the spacing bolt collars 167; and their outer ends are pivotally coupled to the parallel link elements 96b—96b by the trunnion-spacer-bolt 168. The two links 96b are rigidly cross connected by the spacer collars and bolts 170 and by an inverted T-shaped bar 171 whose central upwardly projecting stem is positioned between the adjacent faces of the cams 145—145, and which carries a pair of rollers 172 that are adapted to be engaged by the edges of the associated cam elements 135a—135b.

The admission and exhaust of motive fluid, to and from the opposite ends of the cylinder 160 is controlled by a balanced double piston valve 173 (see particularly Fig. XXVIII), which is moved in one direction (to establish communication between the motive fluid conduit 174 and the inner, left-hand end of the cylinder 160) by a central cam 175 on the shaft 134b; and in the other direction—(to connect this conduit with the outer, right-hand end of the said cylinder)— by the conical coil compression spring 176.

The shaft 134b (like the shaft 134 of Fig. XXI) is revolved in synchronism with, and at the same speed as, the cam shaft 35 or 27a of the feeder organization; and the cycle of operation of the last described mechanism is as follows:

When the desired quantity of glass has been expelled from the delivery orifice (F) of the feeder, the cams 145 engage the cam rollers 147 on the arms 140 and move the latter to the closed position shown in Figs. XXVI and XXX, where they are held in locked engagement with each other by the dowel pin 177 and the spring pressed latch 178. This movement brings the cam rollers 153 into the plane of action of the cams 125b; and at the conclusion of the said movement the advancing edges of the rotating elements 125b engage the rollers 153 and begin to rock the levers 152 on their trunnion supports on the stud bolt heads 148. During the first phase of this action, (i. e. during the closing movement of the arms 140), the head has been held in its elevated position—(with the rollers 172 in engagement with the depressed, or reduced diameter portions of the cams 135a)—by the pressure of motive fluid in the outer end of the cylinder 160; but as the cams 125b engage the rollers 153 the cam 175 begins to move the valve 173 to the right, thus opening communication between this end of the cylinder and the atmosphere, (see Fig. XXVIII); and the interconnected head and link elements are then moved downwardly by the action of the cams 135a on the rollers 172. This downward motion of the head 87e cooperates with the rotary motion of the cams 125b in producing a concurrent axial and transverse movement of the shear blades, 85c, with and through the molten material—(the ratio between these concurrent movements being determined and controlled by the edge contours and phase relationships of the cams 125b and 135a)—and correspondingly shapes the oncoming severed end of the flowing glass to any desired and predetermined form.

It may be noted that in the operation of the construction now under consideration the closing (i. e. cutting) movement of each shear blade (85c) is effected and controlled by its own actuative cam (125b); and that in consequence of this, the ratio between the axial and the transverse travel of each of these elements may be independently varied, (by changing to edge contour of the corresponding cam), so as to obtain, if desired, an unsymmetrical severing and shaping of the two sides of the flowing stream—(e. g. one-half of the severed end may be tapered or rounded more or less than the opposite half)— and thus compensate for slight inequalities in temperature of in velocity of flow in different parts of the molten material as it is expelled from the delivery orifice.

When the shear blades have been brought to their closed position, by the concurrent lineal and rotative movements of the head 87e and the cams 125b, the rollers 153 pass out of the range of action of the cams 125b, and the associated shear blade and guard cup elements, 85c—85d, are locked to the arms 145—145 by the spring actuated latches 180—180. In the meantime the continued rotation of the cam shaft 134b during this second stage of the operation—(i. e. during the severance of the flowing stream)—moves the valve 173 to its full line position in Fig. XXVII (and dotted line position of Fig. XXVIII) and thus places the inner end of the cylinder 160 in communication with the motive fluid conduit 174. The downward movement of the head 87e which has been initiated, and up to this time controlled, by the cams 135b, is then continued, at a progressively increased speed, by the outward movement of the piston-piston-rod elements 161—162, and the resultant clockwise rotation of the bell crank levers 164; and the severed stream section, that is now embraced by the closed shear blade and guard cup elements 85c—85d, is projected downwardly at an accelerated velocity, which is controlled by the pressure in the cylinder, and which is preferably materially greater than that imparted to it by gravity action alone (infra).

When the desired speed of delivery to the receiving receptacle (e. g. the forming mold) has been attained, the levers 152 and the arms 140 are concurrently released from their interlocked relationship by the engagement of a tapered, or wedge shaped finger 128b with the latches 178 and 180; and the parts are returned to their fully separated or open positions (see dotted lines of Fig. XXX), by the springs 144 and 154. The valve 173 is then moved to the left by the rotation of the cam 175 and the action of the follower spring 176, thus placing the outer end of the cylinder 160 in communication with the motive fluid conduit 174 and opening the opposite inner end thereof to the atmosphere. The link supported head 87e is immediately lifted to its initial position, and held in that position, by the pressure of the motive fluid on the outer side of the piston element 161, in readiness for a repetition of the above described cycle of operation.

The line of movement of the head 87e is controlled by the positioning of the trunnion shaft support 165 for the bell crank lever 164. When this support is located at the point shown in Fig. XXVII, the point of connection between the lever and link elements 164—96b travels in the arc of a circle 168f, and the head 87e will correspondingly move along the substantially straight vertical line O—f'. When the trunnion support is lowered (e. g. to the point P) the pivot bolt 170 will travel in the arc of a circle 168p, and the path of movement of the head will then be inclined outwardly (as indicated by the dotted line O—p). If the pivotal axis of the lever 164 is raised (e. g. to the point R) the pivot connection 168 will move in the arm of a circle 168r; and the movement of the head (87e) will be along the inwardly inclined path O—r (see Fig. XXVII). In both cases the degree of inclination of the paths O—p or O—r will be dependent upon the amount of shift of the bell crank support 165—166; and by adjusting this up or down the lateral component of movement of the downwardly projected charge—to the left or right of the vertical—can be varied and controlled, to impart to the said charge a horizontal velocity which corresponds to that of the moving mold into which it is projected.

The use of my accelerated delivery shear mechanism also enables me to re-shape the upper end of the cut-off stream section to various forms, which are materially different from that which is produced by the cutting action per se. This reshaping effect is obtained by utilizing the accelerating pressure, or downward thrust,—which is exerted by the closed shear blades, on the mass of soft plastic glass that is embraced by the closed guard cups 85d—to spread or expand the upper end of the cut-off charge until it completely fills the adjacent portion of the guard cup cavity, and assumes whatever cross sectional form or outline that may be given thereto (see, for example, Figs. XVII, XXVII, XXXIII and XXXIV). If this upper end of the severed section is to be of convex or flattened contour, (see Figs. XVII and XXVII), the shear blades 85c may be of the usual "cat's eye", or concaved edge form shown in Figs. XII or XXVI,—because in those cases the meeting edges of the cutting elements may be permitted to overlap each other to any desired extent—; but when the re-shaped end is to be given a concaved outline (as shown in Figs. XXXIII and XXXIV) the edges of the reversely surfaced shear blades must be straight (as shown in Fig. XXXII) and can only be allowed to overlap the small distance required to ensure a clean complete severance of the flowing stream of viscous material.

It will also be apparent that the above described re-shaping action may be employed in the formation of mold charges which are of a conical or frusto-conical form, (as indicated by the dotted lines of Figs. XXXIII and XXXIV)—and which may have either a circular, or an oval, or an egg-shaped cross section—by correspondingly shaping the interior surfaces of the guard cups 85a—85d, and by moving these elements downward at such a speed as to obtain the necessary accelerating and spreading pressure on the upper ends of the cut-off sections of molten material. When the closed shear blade and cup elements are opened—by the action of the fingers 128—128a or 128b—the re-shaped charge is completely released and continues to move downward, in the direction, and at the maximum velocity, previously imparted to it by these elements.

It is desirable to eliminate, as far as possible, any cooling of the external surface of the re-shaped mass by the enclosing faces of the guard cups, and the latter are for this reason highly polished and may, if desired, be chromium plated. The time of contact between the shear blades and guard cup elements and the glass is of course exceedingly short, and the attendant transfer of heat from the semi-molten material to the cooler metal is correspondingly small; but in order to avoid any possible overheating of the latter I have provided a pair of nozzles 182—182 (see Figs. XXVII and XXX), which are positioned outside of the path of movement of the members 85c—85d, but in such relation thereto, that when these parts are in their opened and raised position they are exposed to blasts of cooling fluid which issue from these nozzles and are directed against the lower and inner surfaces of the shear blades and cups. The fluid which is used is preferably one which will not only exercise the desired cooling effect, but will also deposit a thin film of lubricant (e. g. water or oil vapor) on the glass engaging surfaces, and will thereby eliminate any tendency to either mar the mold charge "skin" or to cause it to adhere to the hot metal.

Because of the high reciprocatory speed at which the elements of my accelerated delivery (and charge-reshaping) mechanism are preferably operated; it is desirable to minimize the effects of inertia and momentum, by keeping all of the rapidly moving members as light as possible; and with this object in view I prefer to make the majority of such parts of either aluminum, or stainless (18—8) steel, or of suitable aluminum alloys, which have the additional characteristics of being relatively insensitive to thermal distortion at high temperatures. It will, of course, be understood that in the case of such constructions as are shown in Figs. XXV to XXXIV inclusive, recoil springs—such as are illustrated in Fig. XI—may be employed, if desired, to assist in elastically checking and reversing the downward movement of the shear head, after the shear blade and guard cup elements have been opened to release the moving charge. It will also be understood that various structural details of the several forms of apparatus hereinbefore disclosed (but which have not in all instances been specifically illustrated or described) can be readily added or modified by the skilled draftsman or machinist without further explanation.

It will now be apparent, to those skilled in this art, that the above described combination of a continuous forced flow feeder (which subjects the issuing stream of molten material to the uninterrupted action of a positive extrusion force which is constant in direction and varies only in magnitude)—with an accelerated delivery shear mechanism—which severs the continuously flowing stream without retarding or interfering with its free downward movement in the zone of severance, and which imparts to the cut-off section a velocity that is materially greater than it can attain under the action of gravity alone—affords a very efficient means of supplying a rapid succession of preformed mold charges to the receiving receptacles of a forming machine, and thereby materially increases the possible speed of operation, and the resultant output, of the said machine. It will also be apparent that these results can be accomplished by combining any of the forms of feeder construction herein disclosed with any of the accelerated delivery (and charge re-shaping) shear mechanisms heretofore described; and that, with the preceding disclosure as a guide, engineers or others familiar with glass fabricating operations, will be enabled to design many other alternative forms of apparatus which will embody in whole or in part the characteristic features of my present invention. I do not therefore limit myself to any of the specific structural arrangements of operative parts, which I have illustrated and described as alternative exemplifications of these improvements; or to any of the exact modes of procedure, or functional action which may differentiate one of these from another. My invention relates broadly to the general method of operation, and to the general combinations of instrumentalities, which I have herein set forth and

What I claim as new and desire to secure by Letters Patent is:

1. A method of shaping mold charges of molten glass, which consists in severing such a charge from a moving stream of molten glass, and predeterminedly controlling the application of the severing forces transversely of such stream and predeterminedly varying the point of application of such forces relatively to movement of said stream at the point of severance throughout the entire severing operation.

2. An improvement in the art of feeding glass, which comprises the continuous forced expulsion of a stream of the molten material from a parent body by applying thereto a constantly acting external force to continually complement the force of gravity, periodically severing the continuously flowing stream without interfering with the uninterrupted flow thereof, moving the cut off portion away from the oncoming portion at a velocity greater than that imparted to it by gravity action and conserving the heat of and shaping such cut-off portion during such movement.

3. An improvement in the art of forming a series of preshaped mold charges of molten glass, which comprises the establishment and maintenance of a constantly flowing stream of such material through a submerged delivery orifice, the periodic severance of said stream below and in spaced relationship to said orifice, the shaping of the oncoming end of said stream to predetermined form by the act of severance, the re-shaping of the upper end of the severed section by the application thereto of a downwardly applied external pressure while substantially confining said section and while impelling it at a high velocity toward a receiving receptacle.

4. A method of forming a succession of mold charges of plastic material such as molten glass and of shaping such charges, which consists in maintaining a body of such material above and in communication with a continuously open flow orifice, continuously delivering material from said body through said orifice, periodically severing the stream issuing from said orifice at a point below but adjacent to said orifice, positively impelling each such charge so severed toward a receiving receptacle, conserving the heat of such charge and shaping the charge while so impelling the same and then projecting the charge at a high velocity into a receiving receptacle.

5. A method of forming a succession of mold charges of plastic material such as molten glass and of shaping such charges, which consists in maintaining a body of such material above and in communication with a continuously open flow orifice, continuously delivering material from said body through said orifice, periodically severing the stream issuing from said orifice at a point below but adjacent to said orifice, positively impelling each such charge so severed toward a receiving receptacle, simultaneously confining the charge so impelled while shaping the same and then projecting the charge at a high velocity into a receiving receptacle.

6. A method of forming a succession of mold charges from plastic material such as molten glass, which consists in maintaining a body of such material above and in open communication with a continuously open orifice, creating a flow through said orifice, severing the stream issuing from the orifice at a point below but adjacent said orifice, and shaping the charge as it issues from such orifice and during such severance, then in projecting said charge downwardly and laterally while subjecting the same to the action of reshaping forces.

7. A method of forming a succession of mold charges from plastic material such as molten glass, which consists in maintaining a body of such material above and in open communication with a continuously open orifice, creating a flow through said orifice, severing the stream issuing from the orifice at a point below but adjacent said orifice, and then projecting the severed portion downwardly and laterally at a high velocity.

8. A method of forming a succession of mold charges from plastic material such as molten glass, which consists in maintaining a body of such material above and in open communication with a continuously open orifice, creating a flow through said orifice, severing the stream issuing from the orifice at a point below but adjacent said orifice, and then projecting the severed portion downwardly and laterally at a high velocity while shaping the same.

9. In combination in a feeder for plastic material such as molten glass, a receptacle for molten glass provided with an opening in the bottom thereof, a passage extending downwardly from said opening and communicating with a delivery orifice, an extending chamber communicating with said passage for receiving material therefrom, a screw extending downwardly through said opening and into said passage, means for continuously rotating said screw to continuously impel material from said receptacle through said passage and to apply a constant expelling force to the material over the orifice, and means for varying the fluid pressure above the material within said chamber to periodically augment the flow through the orifice.

10. In combination in a feeder for plastic material such as molten glass, a receptacle for molten glass provided with an opening in the bottom thereof, a passage extending downwardly from said opening and communicating with a delivery orifice, an extending chamber communicating with said passage for receiving material therefrom, a screw extending downwardly through said opening and into said passage, means for continuously rotating said screw to continuously impel material from said receptacle through said passage and out said orifice under a constant expelling force, and means for periodically expelling material from said chamber to augment the flow of material through said orifice.

11. In combination in a feeder for plastic material such as molten glass, a receptacle for molten glass provided with an opening in the bottom thereof, a passage extending downwardly from said opening and communicating with a delivery orifice, an extending chamber communicating with said passage for receiving material therefrom, a screw extending downwardly through said opening and into said passage, means for continuously rotating said screw to continuously impel material from said receptacle through said passage and out through said orifice and means for periodically connecting the interior of said chamber to a source of superatmospheric pressure to discharge material from said chamber into said passage and augment the flow through said orifice.

12. In combination in a feeder for molten glass, means for delivering a suspended stream of molten glass, a shear mechanism for severing charges of molten glass from said stream, means associated with said shear mechanism for shaping the upper end of each charge and confining such charge laterally while the lower end is unsupported and means for moving said shear mechanism and associated means to project the shaped charge at high velocity into a receiving mold.

13. In combination in a feeder for molten glass, means for delivering molten glass in the form of a suspended stream, means for cutting a succession of mold charges from such stream while in suspension, means for substantially confining each such charge while unsupported and for projecting the same at a high velocity while shaping the upper end thereof.

14. A method of forming a succession of mold charges from molten glass which consists in maintaining a body of molten glass over a continuously open flow orifice, creating a continuous and pulsating flow through said orifice, periodically severing the resultant stream into mold charges, applying an accelerating force to each such separate charge and utilizing such force to shape the upper end of said charge and project the same at high velocity to a receiving mold.

15. A method of forming a succession of mold charges from molten glass which consists in maintaining a body of molten glass over a continuously open flow orifice, causing the glass to flow continuously in a suspended stream through said orifice, periodically severing such stream into a succession of individual mold charges, applying an accelerating force to each such separate mold charge to project it downwardly at a velocity sufficient to spread said charge laterally and confining and reshaping said charge during the application of said force.

16. The method of forming a succession of mold charges from a body of molten glass maintained over a continuously open flow orifice which consists in continuously maintaining the glass over the orifice under an expelling force other than gravity, periodically subjecting the glass over the orifice to an additional expelling force to augment the flow through the orifice, and severing a mold charge from the resultant stream between such periods of augmented flow.

17. A method of forming a succession of mold charges from a body of molten glass maintained over a continuously open flow orifice which consists in establishing a flow through the orifice by continuously applying an expelling force thereto other than gravity, periodically accelerating the flow through the orifice, severing a mold charge from the resultant flow between such periods of accelerated flow, and moving each such severed charge at a high velocity toward a receiving mold while simultaneously confining and reshaping such charge.

18. A glass feeder comprising a forehearth having an outlet passage in the bottom thereof, a hollow member extending below said forehearth in communication with said passage and having a discharge orifice in the bottom thereof, a screw impeller projecting into said forehearth and having its lower end extending through said passage and into said hollow member, means for rotating said impeller to continuously apply an expelling force on the glass at the orifice, and means for periodically reciprocating said impeller while continuing the rotation thereof to vary such expelling force.

19. A glass feeder comprising a forehearth having a discharge outlet in the bottom thereof, a screw impeller projecting into said forehearth in alignment with said discharge outlet, means for continuously rotating said impeller to apply a continuous expelling force to the glass at the discharge outlet, and means for reciprocating said continuously rotating impeller to move it alternately toward and away from said outlet whereby on the down stroke of the impeller the glass is being expelled through the orifice under the combined action of gravity, the end thrust of the rotating impeller and pressure of the downwardly moving impeller, and on the up stroke to gravity and to the end thrust of the rotating screw impeller.

20. A glass feeder comprising a molten glass container having a submerged discharge outlet in the bottom thereof, a screw impeller projecting into said container in alignment with said outlet, means for reciprocating said screw impeller, and means for rotating said impeller during the upward movement thereof to counteract the glass lifting action of the rising impeller and apply a continuous expelling force to the glass at the outlet.

21. A glass feeder comprising a molten glass container having a submerged discharge outlet in the bottom thereof, an impeller projecting into said container in alignment with said outlet, means for reciprocating said impeller, and means for applying an expelling force to the glass outlet during the upward movement of said impeller to prevent any retraction of the glass at the outlet by the lifting action of said impeller.

22. A glass feeder comprising a forehearth having a discharge orifice in the bottom thereof, a screw impeller projecting into said forehearth in alignment with said orifice, means for reciprocating said screw impeller, and means for rotating said impeller during the upward movement thereof to counteract the glass lifting action of the rising impeller and apply a continuous expelling force to the glass at the orifice including a driving member, a friction clutch between said impeller and said driving member, and means for engaging said clutch as said impeller starts to move upwardly.

23. A glass feeder comprising a forehearth having an orifice in the bottom thereof, a screw impeller projecting into said forehearth in alignment with said orifice, spring elements for counterbalancing said impeller, means for periodically moving said screw impeller toward said orifice to place said spring elements under tension, means for rotating said impeller, and means for varying the distance of travel of said impeller.

FRANK L. O. WADSWORTH.